United States Patent

Hetterscheid et al.

[15] 3,689,797

[45] Sept. 5, 1972

[54] CIRCUIT ARRANGEMENT IN A PICTURE DISPLAY DEVICE UTILIZING A STABILIZED SUPPLY VOLTAGE CIRCUIT

[72] Inventors: Wilhelmus Theodorus Hendrikus Hetterscheid; Gerrit Pieter Johannes van Schaik, both of Nijmegen, Netherlands

[73] Assignee: U.S. Philips Corporation, New York, N.Y.

[22] Filed: April 13, 1970

[21] Appl. No.: 27,853

[30] Foreign Application Priority Data

April 25, 1969 Netherlands..............6906394

Nov. 4, 1969 Netherlands..............6916659

[52] U.S. Cl...............................................315/27 TD

[51] Int. Cl...............................................H01j 29/70

[58] Field of Search.........................315/27 TD, 27 R

[56] References Cited

UNITED STATES PATENTS 3,402,318 9/1968 McDonald.............315/27 TD 3,428,856 2/1969 Jones.....................315/27 TD

*Primary Examiner*—Carl D. Quarforth

*Assistant Examiner*—J. M. Potenza

*Attorney*—Frank R. Trifari

[57] ABSTRACT

A stabilized supply voltage circuit for a picture display device comprising a chopper wherein the switching signal has the line frequency and is duration-modulated. The coil of the chopper constitutes the primary winding of a transformer a secondary winding of which drives the line output transistor so that the switching transistor of the chopper also functions as a driver for the line output stage. The oscillator generating the switching signal may be the line oscillator. In a special embodiment the driver and line output transistor conduct simultaneously and in order to limit the base current of the line output transistor a coil shunted by a diode is incorporated in the drive line of the line output transistor. Other secondary windings of the transformer drive diodes which conduct simultaneously with the efficiency diode of the chopper so as to generate further stabilized supply voltages.

7 Claims, 10 Drawing Figures

INVENTORS
WILHELMUS TH.H.HETTERSCHEID
GERRIT P.J.VAN SCHAIK
BY
Frank R. Trifari
AGENT

INVENTORS
WILHELMUS TH.H.HETTERSCHEID
GERRIT P.J.VAN SCHAIK
BY
AGENT

INVENTORS
WILHELMUS TH.H.HETTERSCHEID
GERRIT P. J.VAN SCHAIK
BY
AGENT

CIRCUIT ARRANGEMENT IN A PICTURE DISPLAY DEVICE UTILIZING A STABILIZED SUPPLY VOLTAGE CIRCUIT

The invention relates to a circuit arrangement in a picture display device wherein the input direct voltage between two input terminals, which is obtained be rectifying the mains alternating voltage, is converted into a stabilized output direct voltage by means of a switching transistor and a coil and wherein the transistor is connected to a first input terminal and an efficiency diode is connected to the junction of the transistor and the coil. The switching transistor is driven by a pulsatory voltage of line frequency which pulses are duration-modulated in order to saturate the switching transistor during part of the period dependent on the direct voltage to be stabilized and to cut off this transistor during the remaining part of the period. The pulse duration modulation is effected by means of a comparison circuit which compares the direct voltage to be stabilized with a substantially constant voltage, the coil constituting the primary winding of a transformer.

Such a circuit arrangement is known from German "Auslegeschrift" 1.293.304. wherein a circuit arrangement is described which has for its object to convert an input direct voltage which is generated between two terminals into a different direct voltage. The circuit employs a switch connected to the first terminal of the input voltage and periodically opens and closes so that the input voltage is converted into a pulsatory voltage. This pulsatory voltage is then applied to a coil. A diode is arranged between the junction of the switch and the coil and the second terminal of the input voltage whilst a load and a charge capacitor in parallel thereto are arranged between the other end of the coil and the second terminal of the input voltage. The assembly operates in accordance with the known efficiency principle i.e., the current supplied to the load flows alternately through the switch and through the diode. The function of the switch is performed by a switching transistor which is driven by a periodical pulsatory voltage which saturates this transistor for a given part of the period. Such a configuration is known under different names in the literature; it will be referred to herein as a "chopper." A known advantage thereof, is that the switching transistor must be able to stand a high voltage or provide a great current but it need not dissipate a great power. The output voltage of the chopper is compared with a constant reference voltage. If the output voltage attempts to vary because the input voltage and/or the load varies, a voltage causing a duration modulation of the pulses is produced at the output of the comparison arrangement. As a result the quantity of the energy stored in the coil varies and the output voltage is maintained constant. In the German "Auslegeschrift" referred to it is therefore an object to provide a stabilized supply voltage device.

In the circuit arrangement according to the mentioned German "Auslegeschrift" the frequency of the load variations or a harmonic thereof is chosen as the frequency for the switching voltage. Particularly when the load fed by the chopper is the line deflection circuit of a picture display device, wherein thus the impedance of the load varies in the rhythm of the line frequency, the frequency of the switching voltage is equal to or is a multiple of the line frequency.

It is to be noted that the chopper need not necessarily be formed as that in the mentioned German "Auslegeschrift." In fact, it is known from literature that the efficiency diode and the coil may be exchanged. It is alternatively possible for the coil to be provided at the first terminal of the input voltage whilst the switching transistor is arranged between the other end and the second terminal of the input voltage. The efficiency diode is then provided between the junction of said end and the switching transistor and the load. It may be recognized that for all these modifications a voltage is present across the connections of the coil which voltage has the same frequency and the same shape as the pulsatory switching voltage. The control voltage of a line deflection circuit is a pulsatory voltage which causes the line output transistor to be saturates and cut off alternately. The invention is based on the recognition that the voltage present across the connections of the coil is suitable to function as such a control voltage and that the coil constitutes the primary of a transformer. To this end the circuit arrangement according to the invention is characterized in that a secondary winding of the transformer drives the switching element which applies a line deflection current to line deflection coils and by which the voltage for the final anode of a picture display tube which forms part of the picture display device is generated, and that the ratio between the period during which the switching transistor is saturated and the entire period, i.e., the switching transistor duty cycle is between 0.3 and 0.7 during normal operation.

The invention is also based on the recognition that the duration modulation which is necessary to stabilize the supply voltage with the switching transistor does not exert influence on the driving of the line output transistor. This resides in the fact that in case of a longer or shorter cut-off period of the line output transistor the current flowing through the line deflection coils thereof is not influenced because of the efficiency diode current and transistor current are taken over or, in case of a special kind of transistor, the collector-emitter current is taken over by the base collector current and conversely. However, in that case the above-mentioned ratios of 0.3 : 0.7 should be taken into account since otherwise this take-over principle is jeopardized.

As will be further explained the use of the switching transistor as a driver for the line output transistor in an embodiment to be especially described hereinafter has the further advantage that the line output transistor automatically becomes non-conductive when this switching transistor is short circuited so that the deflection and the EHT for the display tube drop out and thus avoid damage thereof.

Due to the step according to the invention the switching transistor in the stabilized supply functions as a driver for the line deflection circuit. The circuit arrangement according to the invention may in addition be equipped with a very efficient safety circuit so that the reliability is considerably enhanced, which is described in the U.S. Pat. No. 3,629,686. The invention is furthermore based on the recognition of the fact that the pulsatory voltage present across the connections of the coil is furthermore used and to this end the circuit arrangement according to the invention is characterized in that secondary windings of the transformer drive diodes which conduct simultaneously with the efficiency diode so as to generate further stabilized direct voltages, one end of said diodes being connected to ground.

In order that the invention may be readily carried into effect, a few embodiments thereof will now be described in detail by way of example with reference to the accompanying diagrammatic drawings in which.

FIGS. 3a 3b, 3c and 3d show other embodiments of the chopper.

Figure 1:
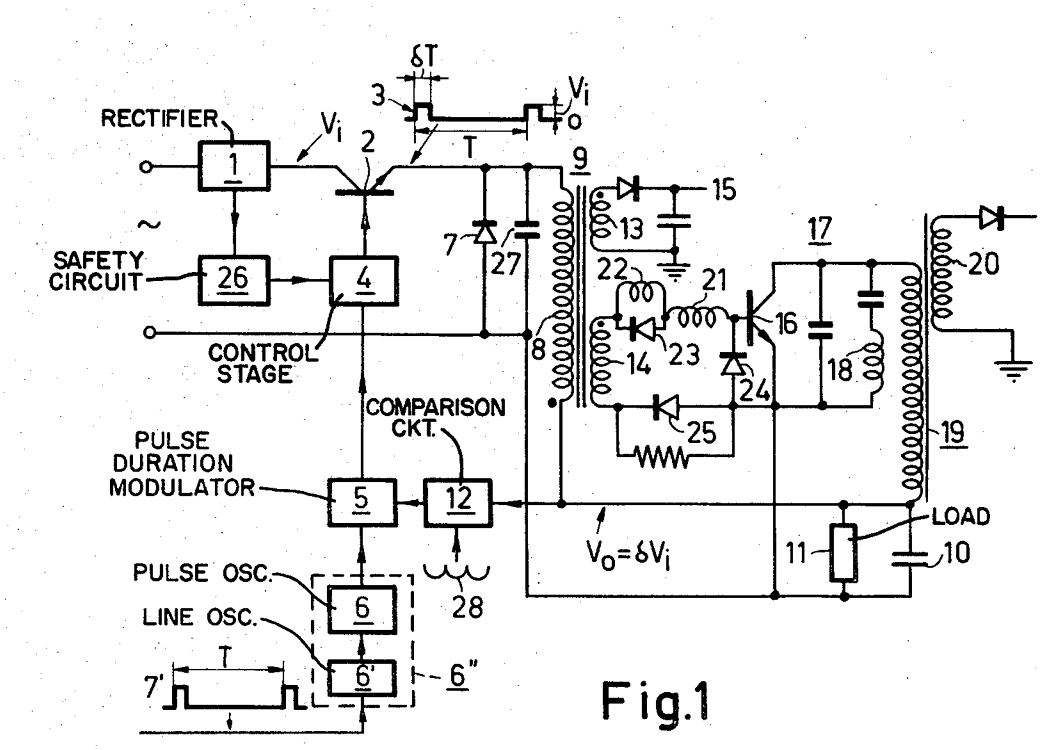
FIG. 1 shows a principle circuit diagram wherein the chopper and the line deflection circuit are further shown but other circuits are not further shown.
Figure 4A:
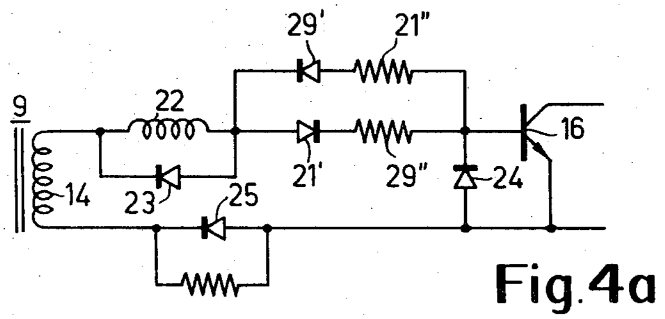
Figure 4B:
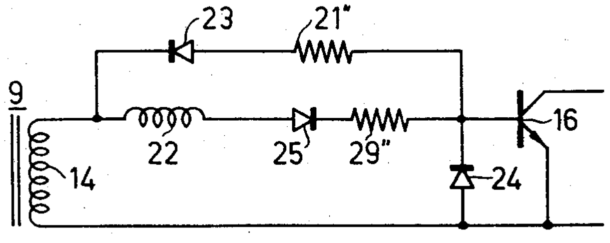

FIGS. 4a and 4b show modifications of part of the circuit arrangement of FIG. 1.

In FIG. 1 the reference numeral 1 denotes a rectifier circuit which converts the mains voltage supplied thereto into a non-stabilized direct voltage. The collector of a switching transistor 2 is connected to one of the two terminals between which this direct voltage is obtained, said transistor being of the npn-type in this embodiment and the base of which receives a pulsatory voltage which originates through a control stage 4 from a modulator 5 and causes transistor 2 to be saturated and cut off alternately. The voltage waveform 3 is produced at the emitter of transistor 2. In order to maintain the output voltage of the circuit arrangement constant, the duration of the pulses provided is varied in modulator 5. A pulse oscillator 6 supplies the pulsatory voltage to modulator 5 and is synchronized by a signal of line frequency which originates from the line oscillator 6′ present in the picture display device. This line oscillator 6′ is in turn directly synchronized in known manner by pulses 7′ of line frequency which are present in the device and originate for example from a received television signal if the picture display device is a television receiver. Pulse oscillator 6 thus generates a pulsatory voltage the repetition frequency of which is the line frequency.

The emitter of switching transistor 2 is connected at one end to the cathode of an efficiency diode 7 whose other end is connected to the second input voltage terminal and at the other end to primary winding 8 of a transformer 9. Pulsatory voltage 3 which is produced at the cathode of efficiency diode 7 is clamped against the potential of said second terminal during the intervals when this diode conducts. During the other intervals the pulsatory voltage 3 assumes the value $V_i$. A charge capacitor 10 and a load 11 are arranged between the other end of winding 8 and the second input voltage terminal. The elements 2,7,8,10 and 11 constitute a so-called chopper producing a direct voltage across charge capacitor 10, provided that capacitor 10 has a sufficiently great value for the line frequency and the current applied to load 11 flowing alternately through switching transistor 2 or through efficiency diode 7. The output voltage $V_o$ which is the direct voltage produced across charge capacitor 10 is applied to a comparison circuit 12 which compares the voltage $V_o$ with a reference voltage. Comparison circuit 12 generates a direct voltage which is applied to modulator 5 so that the duration of the effective period $\delta$ T of switching transistor 2 relative to the period T of pulses 3 varies as a function of the variations of output voltage $V_0$. In fact, it is readily evident that output voltage $V_o$ is proportional to the ratio $\delta$:

$$V_o = V_i \cdot \delta$$

Load 11 of the chopper consists in the consumption of parts of the picture display device which are fed by output voltage $V_0$. In a practical embodiment of the circuit arrangement according to FIG. 1 wherein the mains alternating voltage has a nominal effective value of 220 V and the rectified voltage $V_i$ is approximately 270 V, output voltage $V_o$ for $\delta = 0.5$ is approximately 135 V. This makes it also possible, for example, to feed a line deflection circuit as is shown in FIG. 1 wherein load 11 then represents different parts which are fed by the chopper. Since voltage $V_o$ is maintained constant due to pulse duration modulation, the supply voltage of this line deflection circuit remains constant with the favorable result that the line amplitude(= the width of the picture displayed on the screen of the picture display tube) likewise remains constant as well as the EHT required for the final anode of the picture display tube in the same circuit arrangement independent of the variations in the mains voltage and the load on the EHT generator (= variations in brightness).

However, variations in the line amplitude and the EHT may occur as a result of an insufficiently small internal impedance of the EHT generator. Compensation means are known for this purpose. A possibility within the scope of the present invention is to use comparison circuit 12 for this purpose. In fact, if the beam current passes through an element having a substantially quadratic characteristic, for example, a voltage-dependent resistor, then a variation for voltage $V_o$ may be obtained through comparison circuit 12 which variation is proportional to the root of the variation in the EHT which is a known condition for the line amplitude to remain constant.

In addition this facilitates smoothing of voltage $V_o$ since the repetition frequency of pulsatory voltage 3 is many times higher than that of the mains and a comparatively small value may be sufficient for charge capacitor 10. If charge capacitor 10 has a sufficiently high value for the line frequency, voltage $V_o$ is indeed a direct voltage so that a voltage having the same form as pulsatory voltage 3 is produced across the terminals of primary winding 8. Thus voltages which have the same shape as pulsatory voltage 3 but have a greater or smaller amplitude are produced across secondary windings 13, 14 of transformer 9 (FIG. 1 shows only 2 secondary windings but there may be more). The invention is based on the recognition that one end of each secondary winding is connected to earth while the other end thereof drives a diode, the winding sense of each winding and the direction of conductance of each diode being chosen to be such that these diodes conduct during the same period as does efficiency diode 7. After smoothing, stabilized supply voltages, for example, at terminal 15 are generated in this manner at the amplitudes and polarities required for the circuit arrangements present in the picture display device. In FIG. 1 the voltage generated at terminal 15 is, for example, positive relative to earth. It is to be noted that the load currents of the supply voltages obtained in this manner cause a reduction of the switching power which is economized by efficiency diode 7. The sum of all diode currents including that of diode 7 is in fact equal to the current which would flow through diode 7 if no secondary winding were wound on transformer 9 and if no simultaneous diode were used. This reduction may be considered an additional advantage of the circuit arrangement according to the invention, for a diode suitable for smaller powers may then be used. However, it will be evident that the overall secondary load must not exceed the primary load since otherwise there is the risk of efficiency diode 7 being blocked so that stabilization of the secondary supply voltages would be out of the question.

It is to be noted that a parabola voltage of line frequency as shown at 28 is produced across the charge capacitor 10 if this capacitor is given a smaller capacitance so that consequently the so-called S-correction is established.

In FIG. 1 charge capacitors are arranged between terminals 15 etc. and earth so as to ensure that the voltages on these points are stabilized direct voltages. If in addition the mean value of the voltage on one of these terminals has been made equal to the effective value of the alternating voltage which is required for heating the filament of the picture display tube present in the picture display device, this voltage is suitable for this heating. This is a further advantage of the invention since the cheap generation of a stabilized filament voltage for the picture display tube has always been a difficult problem in transistorized arrangements.

A further advantage of the picture display device according to the invention is that transformer 9 can function as a separation transformer so that the different secondary windings can be separated from the mains and their lower ends can be connected to ground of the picture display device. The latter step makes it possible to connect a different apparatus such as, for example, a magnetic recording and/or playback apparatus to the picture display device without earth connection problems occurring.

In FIG. 1 the reference numeral 14 denotes a secondary winding of transformer 9 which in accordance with the previously mentioned recognition of the invention can drive line output transistor 16 of the line deflection circuit 17. Line deflection circuit 17 which is shown in a simplified form in FIG. 1 includes inter alia line deflection coils 18 and an EHT transformer 19 a secondary winding 20 of which serves for generating the EHT required for the acceleration anode of the picture display tube. Line deflection circuit 17 is fed by the output voltage $V_o$ of the chopper which voltage is stabilized due to the pulse duration modulation with all previously mentioned advantages. Line deflection circuit 17 corresponds, for example, to similar arrangements which have been described in U.S. Pat. No. 3,504,224 issued Mar. 31, 1970 to J.J. Reichgelt et al., U.S. patent application Ser. No. 737,009 filed June 14, 1968 by W. H. Hetterscheid and U.S. application Ser. No. 26,497 filed April 8, 1970 by W. Hetterscheid et al. It will be evident that differently formed lined deflection circuits are alternatively possible.

Figure 2A:
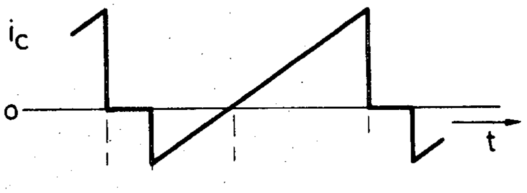
FIGS. 2a, 2b and 2c show the variation as a function of time of two currents and of a voltage occurring in the circuit arrangement according to FIG. 1.

It will now be shown that secondary winding 14 can indeed drive a line deflection circuit so that switching transistor 2 can function as a driver for the line deflection. FIGS. 2a and b show the variation as a function of time of the current $i_C$ which flows in the collector of transistor 16 and of the drive voltage $v_{14}$ across the terminals of secondary winding 14. During the flyback period ( $0, t_1$ ) transistor 16 must be fully cut off because a high voltage peak is then produced at its collector; voltage $v_{14}$ must then be absolutely negative. During the scan period ( $t_1, t_4$ ) a sawtooth current $i_C$ flows through the collector electrode of transistor 16 which current is first negative and then changes its direction. As the circuit arrangement is not free from loss, the instant $t_3$ when current $i_C$ becomes zero lies, as is known, before the middle of the scan period. At the end $t_4$ of the scan period transistor 16 must be switched off again. However, since transistor 16 is saturated during the scan period and since this transistor must be suitable for high voltages and great powers so that its collector layer is thick, this transistor has a very great excess of charge carriers in both its base and collector layers. The removal of these charge carriers takes a period $t_s$ which is not negligible whereafter the transistor is indeed switched off. Thus the fraction δ T of the line period T at which $v_{14}$ is positive must end at the latest at the instant ( $t_4 - t_s$ ) located after the commencement ( $t = 0$) of the previous flyback.

The time δ T may be initiated at any instant $t_2$ which is located between the end $t_1$ of the flyback period and the instant $t_3$ when collector current $i_C$ reverses its direction. It is true that emitter current flows through transistor 16 at the instant $t_2$, but collector current $i_C$ is not influenced thereby, at least not when the supply voltage (= $V_o$) for line deflection circuit 17 is high enough. All this has been described in the U.S. Pat. No. 3,504,224. The same applies to line deflection circuits wherein the collector base diode does not function as an efficiency diode as is the case in the described circuit 17, but wherein an efficiency diode is arranged between collector and emitter of the line output transistor. In such a case the negative part of the current $i_C$ of FIG. 2a represents the current flowing through the said efficiency diode.

After the instant $t_3$ voltage $v_{14}$ must be positive. In other words, the minimum duration of the period T when voltage $v_{14}$ must be positive is ( $t_4 - t_s$ ) $- t_3$ whilst the maximum duration thereof is ( $t_4 - t_s$ ) $- t_1$. In a television system employing 625 lines per raster the line period $t_4$ is approximately 64 μs and the flyback period is approximately 12 μs. Without losses in the circuit arrangement instant $t_3$ would be located approximately 26 μs after the instant $t_1$, and with losses a reasonable value is 22 μs which is 34 μs after the commencement of the period. If for safety's sake it is assumed that $t_s$ lasts approximately 10 μs, the extreme values of δ T are approximately 20 and 42 μs and consequently the values for δ are approximately 0.31 and 0.66 at a mean value which is equal to approximately 0.49. It was previously stated that a mean value of δ = 0.5 was suitable. Line deflection circuit 17 can therefore indeed be used in combination with the chopper in the manner described, and the relative variation of δ may be ( 0.66 − 0.31 ) : 0.49 = 71.5 percent. This is more than necessary to obviate the variations in the mains voltage or in the various loads and to establish the East-West modulation and ripple compensation to be described hereinafter. In fact, if it is assumed that the mains voltage varies between −15 and +10 percent of the nominal value of 220 V, while the 50 Hz ripple voltage which is superimposed on the input voltage $V_i$ has a peak-to-peak value of 40 V and $V_i$ is nominally 270 V, then the lowest occurring $V_i$ is:

$$0.85 \times 270\text{ V} - 20\text{ V} = 210\text{ V}$$

and the highest occurring $V_i$ is $$1.1 \times 270\text{ V} + 20\text{ V} = 320\text{ V}.$$

For an output voltage $V_o$ of 135 V the ratio must thus vary between $$\delta = 135 : 210 = 0.64 \text{ and } \delta = 135 : 320 = 0.42.$$

A considerable problem presenting itself is that of the simultaneous or non-simultaneous drive of line output transistor 16 with switching transistor 2, it being understood that in case of simultaneous drive both transistors are simultaneously bottomed, that is during the period δ T. This depends on the winding sense of secondary winding 14 relative to that of primary winding 8. In FIG. 1 it has been assumed that the drive takes place simultaneously so that the voltage present across winding 14 has the shape shown in FIG. 2*b*. This voltage assumes the value $n(V_i - V_o)$ in the period δ T and the value $-nVo$ in the period $(1-\delta)T$, wherein $n$ is the ratio of the number of turns on windings 14 and 8 and wherein $V_o$ is maintained constant at nominal mains voltage $V_o = \delta V_{inom}$. However, if as a result of an increase or a decrease of the mains voltage $V_i$ increases or decreases proportionally therewith, i.e., $V_i = V_{i\,nom} + \Delta$ V, the positive portion of $V_{14}$ becomes equal to $n(V_{i\,nom} - V_o + \Delta V) = n[(1-\delta)V_{i\,nom} + \Delta V] = n(0.5V_{inom} + \Delta V)$ if $\delta = 0.5$ for $V_i = V_{i\,nom}$. Relatively, this is a variation which is twice as great. For example, if $V_{i\,nom} = 270$ V and $V_o = 135$ V, a variation in the mains voltage of from −15 to +10 percent causes a variation of $V_i$ of from −40.5 V to +27 V which ranges from −30 to +20 percent of 135 V which is present across winding 8 during the period δ *T*. The result is that transistor 16 can always be bottomed over a large range of variation. If the signal of FIG. 2*b* would be applied through a resistor to the base of transistor 16, the base current thereof would have to undergo the same variation while the transistor would already be saturated in case of too low a voltage. In this case it is assumed that transformer 9 is ideal (without loss) and that coil 21 has a small inductance as is explained in the U.S. patent application Ser. No. 737,009 above mentioned. It is therefore found to be desirable to limit the base current of transistor 16.

This may be effected by providing a coil 22 having a large value inductance, approximately 100 μH, between winding 14 and the small coil 21. The variation of said base current $i_b$ is shown in FIG. 2*c* but not to the same scale as the collector current of FIG. 2*a*. During the conducting interval δ *T* current $i_b$ varies as a linear function of time having a final value of $$i_b = \frac{n(V_i - V_o)}{L}\,\delta T,$$

wherein *L* represents the inductance of coil 22. This not only provides the advantage that this final value is not immediately reached, but it can be shown that variation of this final value as a function of the mains voltage has been reduced, for there applies at nominal mains voltage that:

$$i_b = \frac{n(V_{i\,nom} - V_o)}{L}\cdot\frac{V_o}{V_{i\,nom}}\cdot T = n\left(V_o - \frac{V_o^2}{V_{i\,nom}}\right)\frac{T}{L}$$

If the mains voltage $V_i = V_{i\,nom} + \Delta V$, then $$i_b + \Delta i_b = n\left(V_o - \frac{V_o^2}{V_{i\,nom} + \Delta V}\right)\frac{T}{L}$$

$$\approx n\left(V_o - \frac{V_o^2}{V_{i\,nom}} + \frac{V_o^2}{V_{i\,nom}^2}\Delta V\right)\frac{T}{L}$$

so that $$i_b = n\,\frac{V_o^2}{V_{i\,nom}^2}\,\Delta V \cdot \frac{T}{L}.$$

The relative variation is $$\frac{\Delta i_b}{i_b} = \frac{\Delta i_b}{\Delta V}\cdot\frac{\Delta V}{V_{i\,nom}}\cdot\frac{V_{i\,nom}}{i_b}$$

$$= \frac{nV_o^2 T}{V_{i\,nom}^2 L}\cdot\frac{\Delta V}{V_{i\,nom}}\cdot\frac{V_{i\,nom}^2 L}{n(V_{i\,nom} - V_o)V_o T}$$

$$= \frac{V_o}{V_{i\,nom} - V_o}\cdot\frac{\Delta V}{V_{i\,nom}}$$

$$= \frac{\Delta V}{V_{i\,nom}}$$

because $V_{i\,nom} = 2\,V_o$. Thus this variation is equal to that of the mains voltage and is not twice as great.

During switching off, $t_2$, of transistor 16 coil 22 must exert no influence and coil 21 must exert influence which is achieved by arranging a diode 23 parallel to coil 22. Furthermore the control circuit of transistor 16 in this example comprises the two diodes 24 and 25 as described in U.S. application Ser. No. 26,497 above referred to, wherein one of these diodes, diode 25 in FIG. 1, must be shunted by a resistor.

The control circuit of transistor 16 may alternatively be formed as is shown in FIG. 4. In fact, it is known that coil 21 may be replaced by the parallel arrangement of a diode 21′ and a resistor 21″ by which the inverse current can be limited. To separate the path of the inverse current from that of the forward current the parallel arrangement of a the diode 29′ and a resistor 29″ must then be present. This leads to the circuit arrangement shown in the upper part of FIG. 4. This circuit arrangement may now be simplified if it is noted that diodes 25 and 21′ on the one hand and diodes 23 and 29′ on the other hand are series-arranged. The result is shown in the lower part of FIG. 4 which, as compared with the circuit arrangement of FIG. 1, employs one coil less and an additional resistor.

Figures 3A, 3B, 3C, 3D:
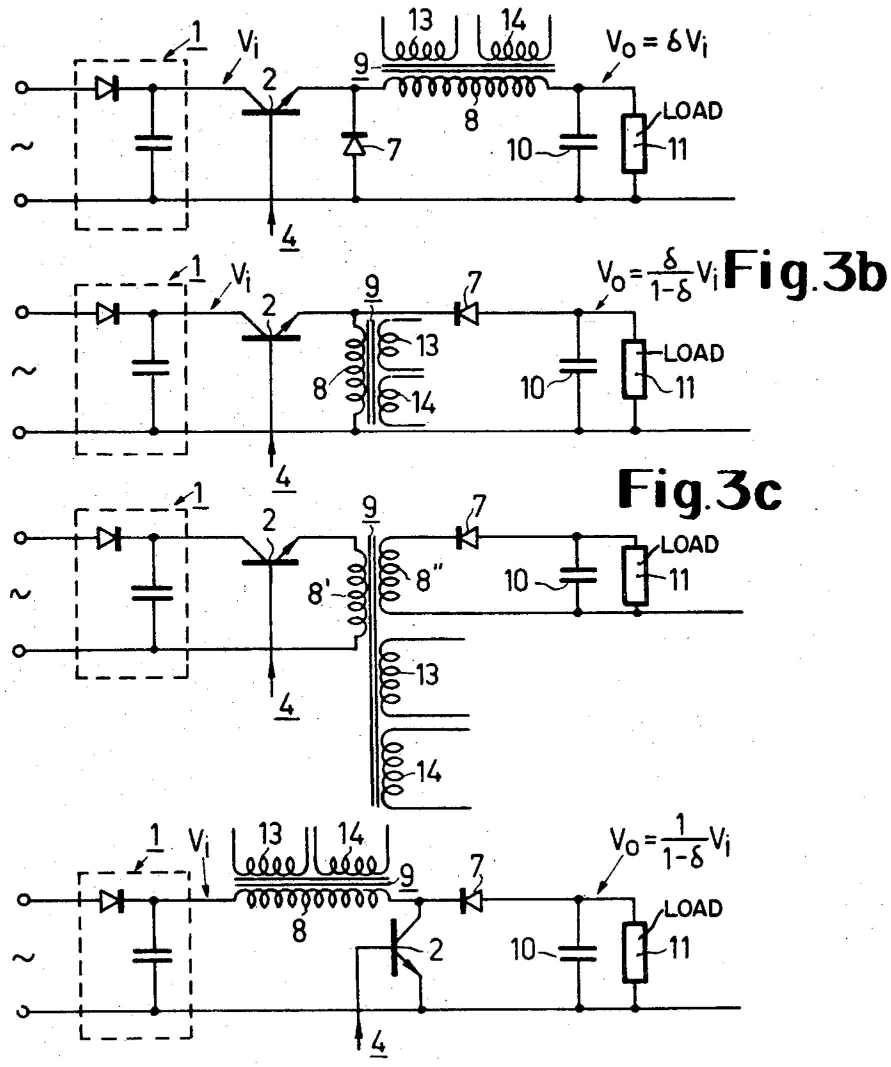

FIG. 3 shows possible modifications of the chopper. FIG. 3*a* shown in a simplified form the circuit arrangement according to FIG. 1 wherein the pulsatory voltage present across the connections of windings 8 has a peak-to-peak amplitude of $V_i - V_o = 0.5\,V_i$ for $\delta = 0.5$, As has been stated, the provision of coil 22 gives a relative variation for the base current of transistor 16 which is equal to that of the mains voltage. In the cases according to FIG. 3*b*, 3*c* and 3*d* the peak-to-peak amplitude of the voltage across winding 8 is equal to $V_i$ so that the provision of coil 22 results in a relative variation which is equal to half that of the mains voltage which is still more favorable than in the first case.

Transistors of the npn type are used in FIG. 3. If transistors of the pnp type are used, the relevant efficiency diodes must of course be reversed.

In this connection it is to be noted that it is possible to obtain an output voltage $V_o$ with the aid of the modifications according to FIGS. 3*b*, *c* and *d*, which voltage is higher than input voltage $V_i$. These modifications may be used in countries such as, for example, the United of America or France where the nominal mains voltage is 117 or 110 V without having to modify the rest of the circuit arrangement.

The above-mentioned remark regarding the sum of the diode currents only applies, however, for the modifications shown in FIGS. 3*a* and *d*.

Figure 2B:
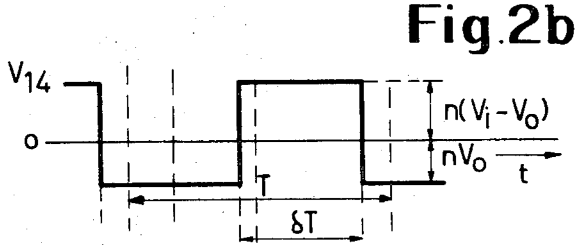
Figure 2C:
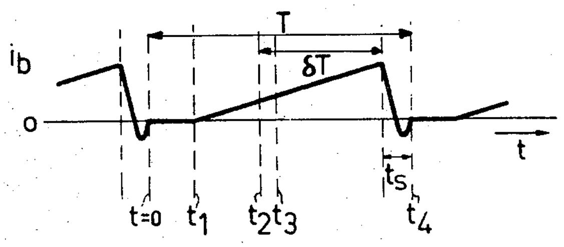

If line output transistor 16 is not simultaneously driven with switching transistor 2, efficiency diodes 7 conducts simultaneously with transistor 16 i.e., during the period which is denoted by $\delta T$ in FIGS. 1 and 2*b*. During that period the output voltage $V_o$ of the chopper is stabilized so that the base current of transistor 16 is stabilized without further difficulty. However, a considerable drawback occurs. In FIG. 1 the reference numeral 26 denotes a safety circuit the purpose of which is to safeguard switching transistor 2 when the current supplied to load 11 and/or line deflection circuit 17 becomes to high, which happens because the chopper stops. After a given period output voltage $V_o$ is built up again, but gradually which means that the ratio $\delta$ is initially small in the order of 0.1. All this is described in U.S. patent No. 3,629,686. The same phenomenon occurs when the display device is switched on. Since $\delta = 0.1$ corresponds to approximately 6 $\mu$s when $T = 64$ $\mu$s, efficiency diode 7 conducts in that case for $64 - 6 = 58$ $\mu$us so that transistor 16 is already switched on at the end of the scan or at a slightly greater ratio $\delta$ during the flyback. This would cause an inadmissibly high dissipation. For this reason the simultaneous drive is therefore to be preferred.

The line deflection circuit itself is also safeguarded: in fact, if something goes wrong in the supply, the driver voltage of the line deflection circuit drops out because the switching voltage across the terminals of primary winding 8 is no longer present so that the deflection stops. This particularly happens when switching transistor 2 starts to constitute a short-circuit between emitter and collector with the result that the supply voltage $V_o$ for the line deflection circuit in the case of FIG. 1 becomes higher, namely equal to $V_i$. However, the line output transformer is now cut off and is therefore also safe as well as the picture display tube and other parts of the display device which are fed by terminal 15 or the like. However, this only applies to the circuit arrangement according to FIG. 1 or 3*a*.

Pulse oscillator 6 applies pulses of line frequency to modulator 5. It may be advantageous to have two line frequency generators as already described, to wit pulse oscillator 6 and line oscillator 6' which is present in the picture display device and which is directly synchronized in known manner by line synchronizing pulses 7'. In fact, in this case line oscillator 6' applies a signal of great amplitude and free from interference to pulse oscillator 6. However, it is alternatively possible to combine pulse oscillator 6 and line oscillator 6' in one single oscillator 6'' (see FIG. 1) which results in an economy of components. It will be evident that line oscillator 6' and oscillator 6'' may alternatively be synchronized indirectly, for example, by means of a phase discriminator. It is to be noted neither pulse oscillator 6, line oscillator 6' and oscillator 6'' nor modulator 5 can be fed by the supply described since output voltage $V_o$ is still not present when the mains voltage is switched on. Said circuit arrangements must therefore be fed directly from the input terminals. If as described above these circuit arrangements are to be separated from the mains, a small separation transformer can be used whose primary winding is connected between the mains voltage terminals and whose secondary winding is connected to ground at one end and controls a rectifier at the other end.

Capacitor 27 is arranged parallel to efficiency diode 7 so as to reduce the dissipation in switching transistor 2. In fact, if transistor 2 is switched off by the pulsatory control voltage, its collector current decreases and its collector-emitter voltage increases simultaneously so that the dissipated power is not negligible before the collector current has becomes zero. If efficiency diode 7 is shunted by capacitor 27 the increase of the collector-emitter voltage is delayed i.e., this voltage does not assume high values until the collector current has already been reduced. It is true that in that case the dissipation in transistor 2 slightly increases when it is switched on by the pulsatory control voltage but on the other hand since the current flowing through diode 7 has decreased due to the presence of the secondary windings, its inverse current is also reduced when transistor 2 is switched on and hence its dissipation has become smaller. In addition it is advantageous to delay these switching-on and switching-off periods to a slight extent because the switching pulses then contain fewer Fourier components of high frequency which may cause interferences in the picture display device and which may give rise to visible interferences on the screen of the display tube. These interferences occupy a fixed position on the displayed image because the switching frequency is the line frequency which is less disturbing to the viewer. In a practical circuit wherein the line frequency is 15,625 Hz and wherein switching transistor 2 is an experimental type suitable for a maximum of 350 V collector-emitter voltage or 1 A collector current and wherein efficiency diode 7 is of the Philips type BA 148 the capacitance of capacitor 27 is approximately 680 pF whilst the load is 70 W on the primary and 20 W on the secondary side of transformer 9. The collector dissipation upon switching off is 0.3 W (2.5 times smaller than without capacitor 27) and 0.7 W upon switching on.

As is known the so-called pincushion distortion is produced in the picture display tubes having a substantially flat screen and large deflection angles which are currently used. This distortion is especially a problem in color television wherein a raster correction cannot be brought about by magnetic means. The correction of the so-called East-West pincushion distortion i.e., in the horizontal direction on the screen of the picture display tube can be established in an elegant manner with the aid of the circuit arrangement according to the invention. In fact, if the voltage generated by comparison circuit 12 and being applied to modulator 5 for duration-modulating pulsatory voltage 3 is modulated by a parabola voltage 28 of field frequency, pulsatory voltage 3 is also modulated thereby. If the power consumption of the line deflection circuit forms part of the load on the output voltage of the chopper, the signal applied to the line deflection coils is likewise modulated in the same manner. Conditions therefore are that the parabola voltage 28 of field frequency has a polarity such that the envelope of the sawtooth current of line frequency flowing through the line deflection coils has a maximum in the middle of the scan of the field period and that charge capacitor 10 has not too small an impedance for the field frequency. On the other hand the other supply voltages which are generated by the circuit arrangement according to the invention and which might be hampered by this component of field frequency must be smoothed satisfactorily.

A practical embodiment of the described example with the reference numerals given provides an output for the supply of approximately 85 percent at a total load of 90 W, the internal resistance for direct current loads being 1.5 ohms and for pulsatory currents being approximately 10 ohms. In case of a variation of ± 10 percent of the mains voltage, output voltage $V_0$ is stable within 0.4 V. Under the nominal circumstances the collector dissipation of switching transistor 2 is approximately 2.5 W.

Since the internal resistance of the supply is so small, it can be used advantageously, for example, at terminal 15 for supplying a class-B audio amplifier which forms part of the display device. Such an amplifier has the known advantages that its dissipation is directly proportional to the amplitude of the sound to be reproduced and that its output is higher than that of a class-A amplifier. On the other hand a class-A amplifier consumes a substantially constant power so that the internal resistance of the supply voltage source is of little importance. However, if this source is highly resistive, the supply voltage is modulated in the case of a class-B amplifier by the audio information when the sound intensity is great which may detrimentally influence other parts of the display device. This drawback is prevented by means of the supply according to the invention.

The 50 Hz ripple voltage which is superimposed on the rectified input voltage $V_i$ is compensated by comparison circuit 12 and modulator 5 since this ripple voltage may be considered to be a variation of input voltage $V_i$. A further compensation is obtained by applying a portion of this ripple voltage with suitable polarity to comparison circuit 12. It is then sufficient to have a lower value for the smoothing capacitor which forms part of rectifier circuit 1 (see FIG. 3). The parabola voltage 28 of field frequency originating from the field time base is applied to the same circuit 12 so as to correct the East-West pincushion distortion.

What is claimed is:

1. An electrical circuit arrangement for a picture display device operating at a given line scanning frequency, comprising a source of unidirectional voltage, an inductor, first switching transistor means for periodically energizing said inductor at said scanning frequency with current from said source, an electrical load circuit coupled to said inductor and having applied thereto a voltage as determined by the ratio of the ON and OFF periods of said transistor, means for maintaining the voltage across said load circuit at a given value comprising means for comparing the voltage of said load circuit with a reference voltage, means responsive to departures of the value of the load circuit voltage from the value of said reference voltage for varying the conduction ratio of the ON and OFF periods of said transistor thereby to stabilize said load circuit voltage at the given value, a line deflection coil system for said picture display device, means for energizing said line deflection coil system from said load voltage circuit means, means for periodically interrupting the energization of said line deflection coil comprising second switching means and means coupled to said inductor for deriving therefrom a switching current in synchronism with the energization periods of said transistor and applying said switching current to said switching means thereby to actuate the same, and means coupled to said switching means and to said load voltage circuit for producing a voltage for energizing said display device.

2. A circuit as claimed in claim 1 wherein the duty cycle of said switching transistor means is normally between 0.3 to 0.7.

3. A circuit as claimed in claim 1 further comprising an efficiency first diode coupled to said inductor.

4. A circuit as claimed in claim 3 further comprising at least a second diode coupled to said deriving means and to ground, and being poled to conduct simultaneously with said efficiency first diode.

5. A circuit as claimed in claim 1 wherein said second switching means comprises a second transistor coupled to said deriving means to conduct simultaneously with said first transistor, and further comprising a coil coupled between said driving means and said second transistor and a third diode shunt coupled to said coil and being poled to conduct when said first and second transistors are non-conducting.

6. A circuit as claimed in claim 1 further comprising a horizontal oscillator coupled to said first transistor, said oscillator being the horizontal oscillator of said display device.

7. A circuit as claimed in claim 1 further comprising means coupled to said inductor for deriving filament voltage for said display device.

* * * * *